United States Patent
Hunacek et al.

(10) Patent No.: US 9,986,308 B2
(45) Date of Patent: *May 29, 2018

(54) METHOD AND DEVICE TO EMBED WATERMARK IN UNCOMPRESSED VIDEO DATA

(71) Applicant: NAGRAVISION S.A., Cheseaux-sur-Lausanne (CH)

(72) Inventors: Didier Hunacek, Blonay (CH); Minh Son Tran, Bourg la Reine (FR); Pierre Sarda, Echallens (CH)

(73) Assignee: NAGRAVISION S.A., Cheseaux-sur-Lausanne (CH)

(*) Notice: Subject to any disclaimer, the term of this patent is extended or adjusted under 35 U.S.C. 154(b) by 0 days. days.

This patent is subject to a terminal disclaimer.

(21) Appl. No.: 15/704,074

(22) Filed: Sep. 14, 2017

(65) Prior Publication Data

US 2018/0048946 A1 Feb. 15, 2018

Related U.S. Application Data

(63) Continuation of application No. 15/424,590, filed on Feb. 3, 2017, now Pat. No. 9,794,646, which is a (Continued)

(30) Foreign Application Priority Data

Apr. 26, 2013 (EP) .................................... 13165591

(51) Int. Cl.
*H04N 7/167* (2011.01)
*H04N 21/8358* (2011.01)
(Continued)

(52) U.S. Cl.
CPC ....... *H04N 21/8358* (2013.01); *G06T 1/0092* (2013.01); *H04N 21/4405* (2013.01);
(Continued)

(58) Field of Classification Search
CPC .......... H04N 21/8358; H04N 21/4405; H04N 21/63345; H04N 21/8355; G06T 1/0092; G06T 2201/0064
See application file for complete search history.

(56) References Cited

U.S. PATENT DOCUMENTS 5,530,751 A 6/1996 Morris
5,574,787 A 11/1996 Ryan
(Continued)

FOREIGN PATENT DOCUMENTS

EP 1 968 316 9/2008
EP 2 391 125 11/2011
(Continued)

OTHER PUBLICATIONS

International Search Report issued in International Application No. PCT/EP2014/058628 dated Aug. 21, 2014.
(Continued)

*Primary Examiner* — Oleg Asanbayev
(74) *Attorney, Agent, or Firm* — DLA Piper LLP (US)

(57) ABSTRACT

A system and method to watermark an uncompressed content received at a client device in a compressed form and encrypted by at least one content key, said content key as well as watermark instruction forming Conditional Access Module (CAS) data, said CAS data being encrypted by a transmission key and comprising at least one signature to authenticate the CAS data, said client device comprising a CAS configured to process the CAS data, a descrambler having an input to receive the encrypted compressed content and an output to produce an compressed content, a decoder to convert the compressed content into uncompressed content, a watermark inserter connected to the output of the decoder, a secure activation module connected with the
(Continued)

watermark inserter, a secure element connected with the watermark inserter and the secure activation module.

7 Claims, 2 Drawing Sheets

Related U.S. Application Data continuation of application No. 14/786,913, filed as application No. PCT/EP2014/057342 on Apr. 11, 2014, now Pat. No. 9,602,890.

(51) Int. Cl.
| | | |
|---|---|---|
| *G06T 1/00* | (2006.01) | |
| *H04N 21/8355* | (2011.01) | |
| *H04N 21/6334* | (2011.01) | |
| *H04N 21/4405* | (2011.01) | |

(52) U.S. Cl.
CPC ... *H04N 21/63345* (2013.01); *H04N 21/8355* (2013.01); *G06T 2201/0064* (2013.01)

(56) References Cited

U.S. PATENT DOCUMENTS

| | | | |
|---|---|---|---|
| 5,579,390 | A | 11/1996 | Ryan et al. |
| 5,651,065 | A | 7/1997 | Stufflet et al. |
| 5,809,139 | A | 9/1998 | Girod et al. |
| 6,285,774 | B1 | 9/2001 | Schumann et al. |
| 6,363,149 | B1 | 3/2002 | Candelore |
| 7,050,588 | B1 | 5/2006 | Wajs et al. |
| 7,073,073 | B1 | 7/2006 | Nonaka et al. |
| 7,516,491 | B1 | 4/2009 | Schlafly |
| 7,761,465 | B1 | 7/2010 | Nonaka et al. |
| 8,336,106 | B2 | 12/2012 | Le Buhan et al. |
| 8,571,213 | B2 | 10/2013 | Tran et al. |
| 8,601,590 | B2 | 12/2013 | Nakano et al. |
| 8,861,729 | B2 | 10/2014 | Folea et al. |
| 2002/0120574 | A1 | 8/2002 | Ezaki |
| 2002/0146123 | A1 | 10/2002 | Tian |
| 2002/0186844 | A1 | 12/2002 | Levy et al. |
| 2003/0016756 | A1 | 1/2003 | Steenholf et al. |
| 2003/0074553 | A1 | 4/2003 | Arkko et al. |
| 2003/0103645 | A1 | 6/2003 | Levy et al. |
| 2003/0112974 | A1 | 6/2003 | Levy |
| 2004/0098603 | A1 | 5/2004 | Corinne |
| 2005/0096753 | A1 | 5/2005 | Arling et al. |
| 2005/0273862 | A1 | 12/2005 | Benaloh et al. |
| 2007/0192610 | A1 | 8/2007 | Chun et al. |
| 2008/0219643 | A1 | 9/2008 | Le Buhan et al. |
| 2009/0290711 | A1 | 11/2009 | Bloom et al. |
| 2010/0070991 | A1 | 3/2010 | Kaag et al. |
| 2010/0128871 | A1 | 5/2010 | Folea et al. |
| 2010/0208891 | A1 | 8/2010 | Folea et al. |
| 2011/0293092 | A1 | 12/2011 | Tran et al. |
| 2012/0114118 | A1 | 5/2012 | Verma |
| 2013/0142382 | A1 | 6/2013 | Petrovic et al. |
| 2014/0040623 | A1 | 2/2014 | Conus et al. |
| 2014/0086408 | A1 | 3/2014 | Bickmore et al. |
| 2015/0016663 | A1 | 1/2015 | Tehranchi et al. |

FOREIGN PATENT DOCUMENTS

| | | |
|---|---|---|
| WO | WO 2009/144111 | 12/2009 |
| WO | WO 2012/143880 | 10/2012 |

OTHER PUBLICATIONS

Written Opinion issued in International Application No. PCT/EP2014/058628 dated Aug. 21, 2014.
International Search Report issued in International Application No. PCT/EP2014/057342 dated Aug. 21, 2014.
Written Opinion issued in International Application No. PCT/EP2014/057342 dated Aug. 21, 2014.
International Search Report issued in International Application No. PCT/EP2014/057331 dated Aug. 21, 2014.
Written Opinion issued in International Application No. PCT/EP2014/057331 dated Aug. 21, 2014.
File History of U.S. Appl. No. 14/786,913.
File History of U.S. Appl. No. 14/786,905.
File History of U.S. Appl. No. 14/786,917.
File History of U.S. Appl. No. 15/424,590.
File History of U.S. Appl. No. 15/661,954.

METHOD AND DEVICE TO EMBED WATERMARK IN UNCOMPRESSED VIDEO DATA

CROSS REFERENCE TO RELATED APPLICATIONS

This application is a continuation of U.S. patent application Ser. No. 15/424,590 filed Feb. 3, 2017, which is a continuation of U.S. patent application Ser. No. 14/786,913 filed Oct. 23, 2015, which is a U.S. National Stage Application of International Application No. PCT/EP2014/057342 filed Apr. 11, 2014, which claims priority from European Patent Application No. 13165591.2 filed Apr. 26, 2013, each of which is incorporated herein by reference in its entirety.

BACKGROUND ART

Using watermarking solution on the un-compressed domain is elegant as the watermarking is done standalone in the client device, and as done in the un-compressed domain, it generally offers the best watermark insertion's capability and better invisibility.

But working after the decoder (for un-compressed watermarking) offers no interaction with the security elements which are linked to the descrambling of the data, thus occurring before the decoder.

The document US2010/128871 describes a solution in which a secondary stream is generated comprising the data allowing to reconstruct the main stream and at the same time to marl the reconstructed stream. As a consequence, the same stream contains the scrambling data and the watermarking data. At the reception, this stream is processed as one set of data to be replaced in the modified stream.

The document EP 2 391 125 describes a solution to allow an individual marking (at the reception device) based on a stream common to all devices. The control object contains the original value, an alternate value and a location. The security unit determines a mathematical operation to be applied on the alternate value to retrieve the original value. The mathematical operation is changed according to an internal parameter of the reception device so that the mathematical operation will be unique per device, allowing to track this device if the stream of descrambling data is analyzed.

BRIEF DESCRIPTION OF THE INVENTION

In the proposed solutions, the same content object comprises the key to descramble the main content and the marking data. This is only suitable when the same element is in charge of both operations and needs a particular descrambler module able to execute both operations.

The aim of the present invention is to enforce the watermarking on a content received by a client device, in particular when the element in charge of the descrambling is independent of the element in charge of the watermarking.

The present invention concerns a method to watermark an uncompressed content received at a client device in a compressed form and encrypted by at least one content key (CW), said content key (CW) as well as watermark instruction forming CAS data, said CAS Data being encrypted by a transmission key and comprising at least one signature to authenticate the CAS Data, said client device comprising:
A Conditional Access Module (CAS) in charge of the CAS Data,
a Descrambler (DSC) having an input to receive the encrypted compressed content and an output to produce an compressed content,
a decoder to convert the compressed content into uncompressed content,
a Watermark inserter (201) connected to the output of the Decoder,
a Secure Activation module (202) connected with the Watermark inserter (201),
a Secure Element (SE 200) connected with the Watermark inserter (201) and the Secure Activation module (202),
said method comprising the following steps:
receiving the CAS Data,
decrypting by the Conditional Access Module (CAS) the CAS Data with the transmission key,
verifying the signature of the CAS Data, and if the signature is valid,
transferring the content key (CW) to the descrambler (103) and the watermark instruction to the Secure Activation module (202),
transferring the watermark instruction and the unique identifier to the Watermark inserter (201),
enabling or disabling watermarking by the Watermark inserter (201), the uncompressed content received from the Decoder by watermarking data initialized by the unique identifier.

BRIEF DESCRIPTION OF THE FIGURES

The present invention will be better understood thanks to the attached figures in which.

DETAILED DESCRIPTION

Conditional access data comprises a content (video or audio data or combination thereof) encrypted by one or a plurality of content keys, and comprises CAS data, i.e. data allowing to decrypt the encrypted content. The CAS data also comprises conditional access conditions associated with the content describing the condition to be met by the decoder to decrypt the content. The conditional access data are broadcasted, unicasted or sent on request of the recipient. The CAS Data can also comprise a watermark instruction to be passed to the Watermarking Inserter.

Once received in the decoder, the CAS data are extracted from the conditional access data and forwarded to a Conditional Access module (CAS in FIGS. 1 and 2), in charge of the enforcement of the security measures defined in the conditional access conditions. This module can have several forms, i.e. a physical module or a software module. A well known solution is in the form of a smart card with interface 7816, but the present invention applies to other form factor or interface such as USB, LVDH, PCMCIA. The module CAS can be also integrated into the secure element SE.

This module comprises the key necessary to decrypt the CAS data and to extract from the CAS data the key (CW) to decrypt the content. In addition to the key, this module extracts the conditions (usage rules) and transfers the key and the conditions to a secure element SE. It is to be noted that the communication between the CAS and the SE is encrypted and protected by a key initialized on both elements.

The messages exchanged between the CAS and the SE could be signed, i.e. a digest of the payload (e.g. watermarking instruction, the random number and the identifier) is calculated by the CAS (using for example hash function) and encrypted by a signature key to produce the signature. This signature is added into the message and the message is preferably encrypted by a transmission key. On the reception side, the message is first decrypted and the digest is calculated on the payload. With the key corresponding with the signature key, the received signature is decrypted and the result is compared with the calculated digest. If both values are the same, the message is authentic. The signature key can be a symmetric key or an asymmetric key (public/private keys).

In a conventional environment, the key obtained by the CAS is transferred to the descrambler DSC in charge of decrypting the content. Once the content is decrypted, the content is processed by a decoder to produce an uncompressed content. A watermarking module WMK receives the uncompressed content and applies the watermark, this watermark being parameterized by a unique identifier of the decoder.

The proposed solution is to have a secure link between the secure element (SE) 200 (refer to FIG. 1) provided by the CAS environment and the un-compressed domain watermarking element 201.

Figure 1:
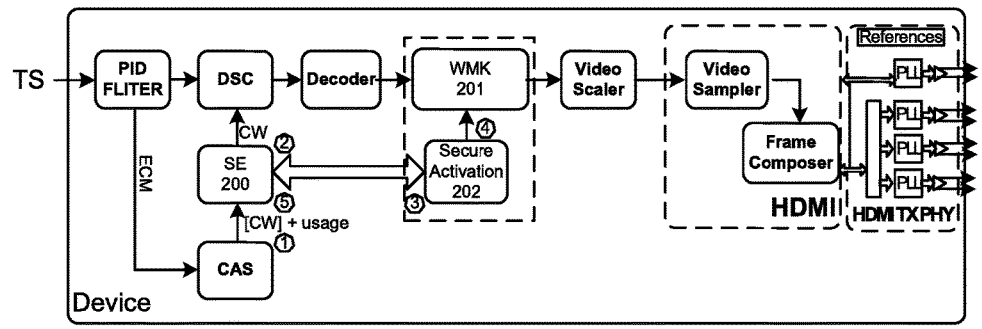
FIG. 1 illustrates a Watermarking on Un-Compressed Content just after the Video Decoder.

According to FIG. 1, the SE 200 relays the CAS data, which introduces the explicit dependence between the successful descrambling operation and the activity of the block located after the decoder, namely the Watermarking Inserter.

The SE 200 also supplies other sensitive information (like a unique ID of a device, the CAS module ID, an ID contained in the CAS data or keys). This information, if transmitted in clear to the Watermarking Inserter could be intercepted and modified. This is why the connection between these two blocks should be secured.

The Watermarking Inserter 201 is here to insert an information (the watermark payload) into the audio and/or video content. This payload is dependant of the unique identifier received from the CAS. It can then be bypassed by a hacker (the audio and/or video content is not sent to the watermarking bloc), or the payload (the watermark data) can be modified. This watermarking inserter can be positioned just after the decoder, or along the line of transmission between the decoder and the final display, like the HDMI transmitter, or the TV screen.

The proposed solution ensures:
A way to ensure the Watermarking Inserter 201 is not bypassed and therefore activated if decided by the CAS. If the Watermarking Inserter 201 doesn't seem to be activated, then the SE 200 stops descrambling the content.
A way to ensure communication between SE 200 and Watermarking Inserter 201, so that the Watermarking Inserter 201 accesses with certitude to the information it requires at a moment T such as the necessary payload to insert into the content. The SE 200 manages all or part of the computations on the information to be inserted. Generally speaking this information is: the Unique
Identifier (UID) representing the decoder or the CAS module, a time stamp (T), and any other information of interest like a specific information (SID) on the content itself. From this data a payload is computed before the insertion into the content. This operation aims at protecting the payload against attacks or transmissions errors (computations through an ECC or an anti-collusion code like Tardos code).

Then all or part of this payload has to be used by the watermarking system to be inserted into the content.

The proposed solution is to add a Secure Activation block 202 which activates/deactivates the Watermarking Inserter 201. For security reason, it is recommended to implement the Secure Activation block 202 and the Watermarking Inserter 201 just after the Video decoder and in a Trusted Execution Environment (TEE). The access between the Secure Activation block 202 (SA 202) and the Watermarking Inserter 201 is not accessible from the host CPU of the client device.

Figure 2:
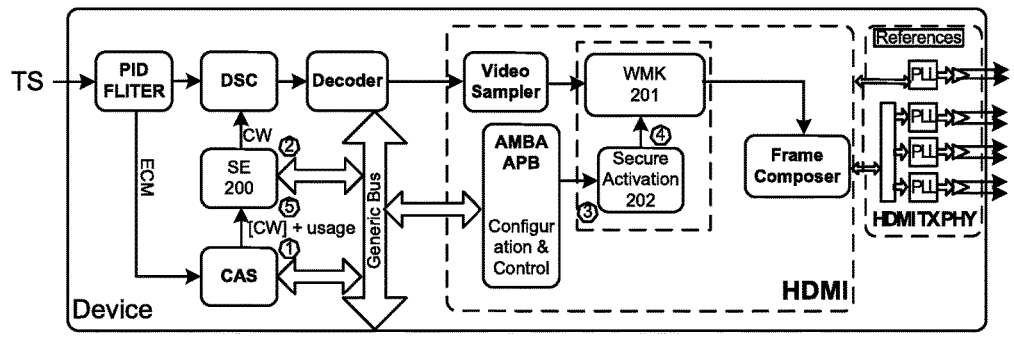
FIG. 2 illustrates a Watermarking on Un-compressed Content into the HDMI.

The Secure Activation block 202 is controlled by some registers accessible, for example, either via a private bus as illustrated in FIG. 1 or via a generic bus (AMBA APB) as illustrated in FIG. 2. The Secure Activation block 202 is able to at least enable/disable two features: watermarking on video content, watermarking on audio content, or combination thereof. In FIG. 1 and FIG. 2, the Secure Activation block 202 and the Watermarking Inserter 201 are connected on the video content.

The main concept relies on the fact that the Secure Activation block 202 has to receive a message called Activation Message (AM) from the SE 200 to activate/deactivate the different features. The AM is also used to transmit the payload necessary to mark the content. Another feature carried out by the Secure Activation block 202 is a secure link with the SE 200 to exchange sensitive information. For example, the SE 200 could transmit secure settings to the Secure Activation block 202. Then the Secure Activation block 202 will transmit them to the Watermarking bloc 201.

The principal attack is that a person records this message and therefore is able to activate or deactivate these features as he wishes. This attack is called "replay attack".

Figure 3:
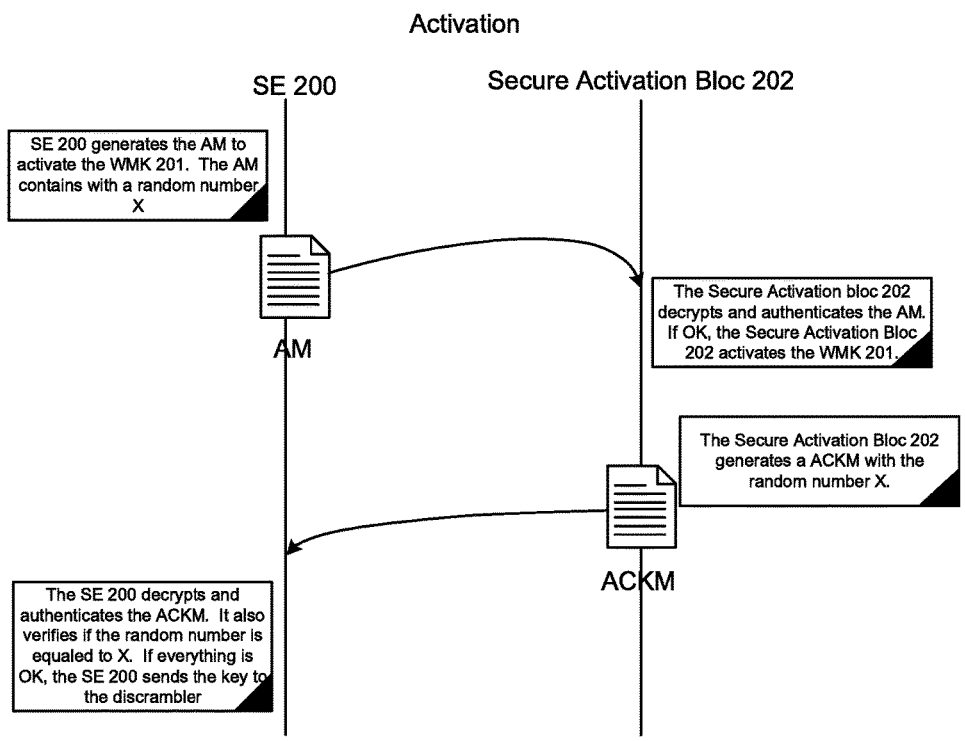
FIG. 3 illustrates an exchange of messages between the SE and the SA.

The second attack is that an attacker tries to modify the content of the message. Therefore when the SE 200 generates an AM, it shall be encrypted and signed for the Secure Activation block 202. In addition, the AM shall embed a random value coming from a True Random Number Generator (TRNG). An example of the AM is illustrated in FIG. 3. It shall at least contain a random value, the activation flag, the payload (containing the UID), the payload size and the signature.

FIG. 2 describes an example where a device is using the HDMI and the Watermarking bloc 201 on the video must be activated. The Conditional Access System (CAS) will receive CAS data. According to this example, the CAS Data are in the form of Entitlement Control Messages ECM. These ECMS contain an encrypted CW and its usage rules. The encrypted CW and its usage rules are transmitted to the SE 200. The usage rules indicate to the SE 200 that the current video content must be watermarked.

This SE 202 and the SA 202 share a common key stored in each device at an initialization stage. This key will be used to encrypt the messages exchanged so that the content cannot be accessed by a third party. Since the communication between these two elements can be intercepted by a third party, it is important to implement a mutual authentication protocol. Each party should be sure to talk to the other party and not with a simulator.

The message transmitted to the Secure Activation module (202) contains a watermark instruction. In case of an activation, the identifier to be embedded into the content is included in this message.

Then the following steps could be executed in accordance with the FIG. 3.

1. The CAS receives an ECM containing an encrypted Control Word (CW) and its usage rules or access conditions.

2. The SE 200 decrypts the CW and its usage rule. The usage rule says for instance that the content shall be decrypted using the DVB-CSA descrambler and the watermarking shall be activated on the video. At the same time, the SE 200 generates the Activation Message (AM) and add a variable value. This variable value should change for each message generated by the Secure Activation block 202. It could be a random value, a counter incremented at each message or a time stamp. This value is stored into the SE 200. The AM is encrypted and signed. Then the AM is sent to the Secure Activation block 202.

3. The Secure Activation block 202 decrypts and authenticates the AM. If the authentication succeeds, the Secure Activation block 202 checks if the variable value to determine if the received value has changed compared to a previous value. In case of a counter, the received variable value should be higher than the last received variable value. The same applies for a time stamp, the new received time stamp should be in advance versus the time stamp received in a previous message. For a random value, the Secure Activation block 202 should store all previously received random values (or at least a predefined number e.g. the last 20) in order to compare the one received with the one contained in the message.

In case that the variable value does not comply with one of the above mentioned rules, the message is rejected. Otherwise, the Secure Activation block 202 activates the features depending on the content of the AM. After the authentication, the Secure Activation block generates an Acknowledge Message (ACKM) which is encrypted and signed. This ACKM is sent back to the SE 200. It shall at least contain the same random value as the AM, and could also contain the activation flag, the payload (UID), the payload size, the ACK flag and the signature. The random number is then stored by the Secure Activation block 202 in order to avoid that the same message is presented later.

4. The SE 200 decrypts and authenticates the ACKM. The ACKM shall contain the same random value than the one in the AM. If the ACKM is not correctly authenticated, not received on time (using a watchdog), or the random value is not the same than into the previous AM, the transfer of the watermark instruction is considered as failed and the SE 202 stops providing the CW to the descrambler.

Figure 4:
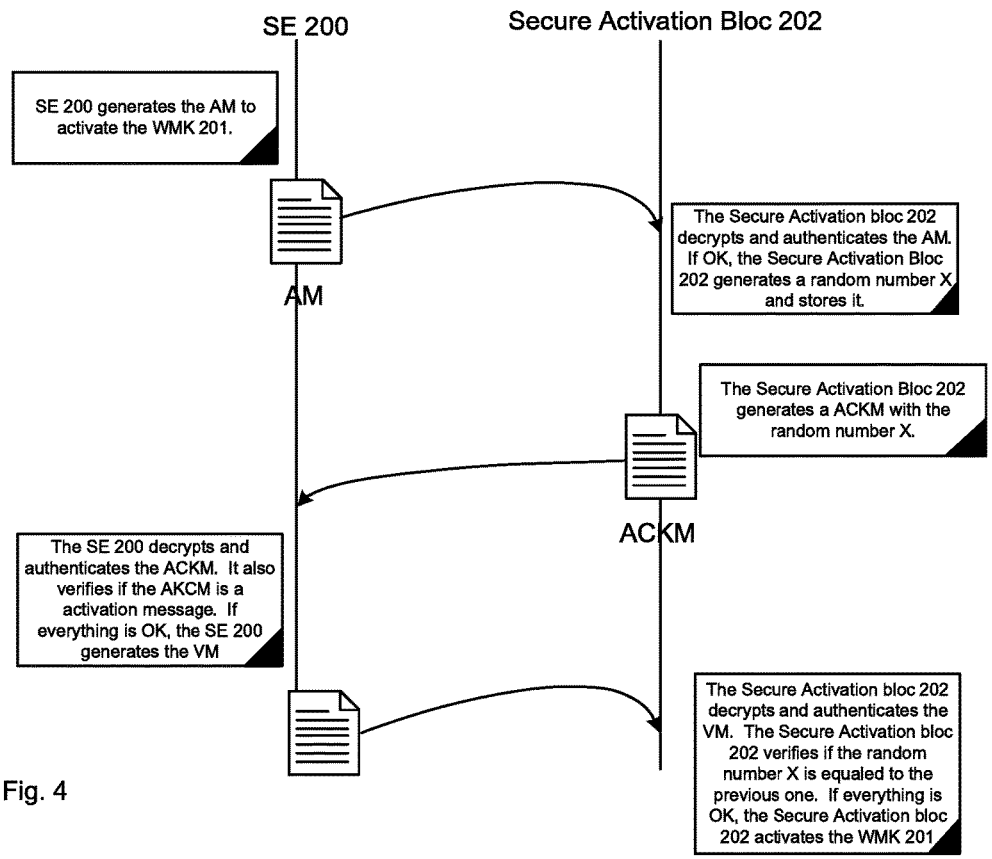
FIG. 4 illustrates an alternate embodiment of the exchange of messages between the SE and the SA.

It is common that the Secure Activation block 202 does not comprise permanent memory. It is therefore not possible to store the last variable value for an accurate anti-replay verification. This is why the FIG. 4 illustrates another method. It is to be noted that this method can be applied even if the SE 202 contains permanent memory.

1. The SE 200 sends a first message (AM) to the Secure Activation block 202 informing that an instruction message will be transmitted. At that stage, the first message can be encrypted or in clear. The message can contain a signature allowing the SA 202 to authenticate the first message. In the example of the FIG. 4, the message is an activation message AM.

2. In case that the message is encrypted and signed, the SA 202 decrypt and verifies the signature. If the signature is correct, the SA 202 then generates a random number X and sends a second message ACKM containing the random number X to the SE 200. The random number X is stored by the SA 202. At that stage, the second message can be encrypted or in clear. This second message is preferably encrypted and contains a signature to ensure that only a genuine SA 202 can generate it.

3. While the SE 202 receives and decrypts (if encrypted) the message ACKM, the SE 202 extracts the random number. With this random number and the watermark instruction, the SE 202 prepares a message, encrypts and signs it. In case that the instruction concerns the disabling of the watermark on the content, this message does not need to contain an identifier. This message is sent to the SA 202.

4. The SA 202 then decrypts and verifies the signature. If the signature is correct, it verifies also that the random number X is the same as the one stored previously. If it differs, the message is rejected. After having passed these controls, the watermark instruction contained in the message can be executed.

5. The SA 202 then prepares a final acknowledgment message FACKM to confirm the execution of the watermark instruction. This message will contain the random number X and is encrypted as well.

6. The SE 200 receives the FACKM and once decrypted, extracts the status of the SA 202. If the SA 202 confirms the successful completion of the watermark instruction, the SE 2002 can then transfer the content key to the Descrambler.

The invention claimed is:

1. A method for watermarking content comprising:
receiving an encrypted message at a client device, the encrypted message comprising a watermark instruction and a signature, the client device comprising:
a watermark inserter connected to receive the content;
a secure activation module connected to a watermark inserter; and
a secure element connected to the secure activation module;
decrypting the message with a transmission key;
verifying the signature of the message and, in response to the signature being valid, transferring the watermark instruction to the secure activation module via the secure element by;
requesting by the secure element a random number from the secure activation module;
generating the random number by the secure activation module, storing the random number, and sending the random number to the secure element;
preparing by the secure element an instruction message containing at least the watermark instruction, the random number, and a second signature on both the watermark instruction and the random number;
sending the message to the secure activation module;
verifying by the secure activation module that the second signature is authentic and that the random number is the same as the random number sent previously and, in response to the verification, accepting the watermark instruction;
sending a final acknowledgment message to the secure element in order to inform the secure element of the successful completion of the transfer;
transferring the watermark instruction from the secure activation module to the watermark inserter; and
switching between enabling and disabling watermarking by the watermark inserter of the content in response to the watermark instruction.

2. The method of claim 1, wherein the content is received in encrypted compressed form at the client device, the encrypted compressed content being encrypted under a content key, the content key being included in the encryption message, the method further comprising:

transferring the content key to a descrambler in response to the transfer of the watermark instruction from the secure activation module to the watermark inserter being successful, the descrambler being configured to input encrypted compressed content and output decrypted compressed content; and decoding the decrypted compressed content and outputting the content to the watermark inserter.

3. The method of claim 1, wherein the secure activation module and the watermark inserter are located in a trusted environment, and wherein the connection between the secure activation module and the watermark inserter is not accessible outside of the trusted environment.

4. The method of claim 1, wherein the encrypted message comprises a unique identifier, said identifier being transferred to the secure activation module and to the watermark inserter together with the watermark instruction to enable the watermarking, said identifier defining a payload to watermark the content.

5. A client device comprising:

an interface configured to receive an encrypted message comprising a watermark instruction, a content key, and a signature;

a descrambler having an input to receive an encrypted content and an output to produce a decrypted content based on the content key;

a watermark inserter connected to receive the decrypted content, the watermark inserter being configured to switch between enabling and disabling the insertion of a watermark into the decrypted content based on the watermark instruction;

a secure activation module connected to the watermark inserter;

a secure element connected to the interface, the descrambler and the secure activation module;

wherein the interface is configured to verify the signature of the encrypted message and, in response to the verification of the signature, to transfer the watermark instruction to the secure activation module via the secure element;

wherein said secure element is configured to verify that the watermark instruction was successfully transferred to the watermark inserter and, in response to the verification of the successful transfer of the watermark instruction to the watermark inserter, to transfer the content key to the descrambler; and wherein the secure activation module comprises a random number generator configured to produce a random number, said secure activation module generating, storing and sending said random number to the secure element, the secure element being configured to prepare a message containing at least the watermark instruction, the random number, and a second signature on both the watermark instruction and the random number, said secure activation module being configured to verify that the signature is authentic and that the random number is the same as the stored random number and, in response to the verification that the signature is authentic and that the random number is the same as the stored random number, accept the watermark instruction and send a final acknowledgment message to the secure element in order to inform the secure element of the successful completion of the transfer.

6. The client device of claim 5, wherein the secure activation module and the watermark inserter are located in a trusted environment, and wherein the connection between the secure activation module and the watermark inserter is not accessible outside of the trusted environment.

7. The client device of claim 5, wherein the encrypted message comprises a unique identifier, said identifier being transferred to the secure activation module and to the watermark inserter together with the watermark instruction to enable the watermarking, said identifier defining a payload to watermark the content.

* * * * *